US012707114B2

(12) United States Patent
Paugam et al.

(10) Patent No.: US 12,707,114 B2
(45) Date of Patent: Aug. 11, 2026

(54) VIDEO OVERLAYERS, DISTRIBUTION MANAGEMENT SYSTEMS AND COMPUTER-IMPLEMENTED METHODS OF OVERLAYING A VIDEO WITH PRODUCT DATA

(71) Applicant: PADAME +, Wasquehal (FR)

(72) Inventors: Jean Pierre Paugam, Wasquehal (FR); Antoine David, Wasquehal (FR)

(73) Assignee: PADAME +, Wasquehal (FR)

( * ) Notice: Subject to any disclaimer, the term of this patent is extended or adjusted under 35 U.S.C. 154(b) by 0 days.

(21) Appl. No.: 19/473,978

(22) PCT Filed: Apr. 17, 2024

(86) PCT No.: PCT/EP2024/060459

§ 371 (c)(1),
(2) Date: Oct. 9, 2025

(87) PCT Pub. No.: WO2024/218172

PCT Pub. Date: Oct. 24, 2024

(65) Prior Publication Data

US 2026/0122308 A1 Apr. 30, 2026

(30) Foreign Application Priority Data

Apr. 17, 2023 (EP) .................................... 23168272

(51) Int. Cl.
*H04N 21/431* (2011.01)
*H04N 21/472* (2011.01)
(Continued)

(52) U.S. Cl.
CPC ... *H04N 21/4316* (2013.01); *H04N 21/47217* (2013.01); *H04N 21/4725* (2013.01); *H04N 21/4728* (2013.01); *H04N 21/47815* (2013.01)

(58) Field of Classification Search
CPC ......... H04N 21/4316; H04N 21/47217; H04N 21/4725; H04N 21/4728; H04N 21/47815
(Continued)

(56) References Cited

U.S. PATENT DOCUMENTS 12,380,484 B1 * 8/2025 Chaturvedi ........ G06Q 30/0631
2018/0091859 A1 3/2018 Moehrle
(Continued)

OTHER PUBLICATIONS

International Search Report and Written Opinion for PCT/EP2024/060459, dated Jul. 10, 2024, 13 pages.
(Continued)

*Primary Examiner* — Cynthia M Fogg
(74) *Attorney, Agent, or Firm* — Tucker Ellis LLP

(57) ABSTRACT

The subject application provides a video overlayer (100), a distribution management system and a computer-implemented method (600) of overlaying a video (200) with product data.
The inventors have found that the use an interactive video overlay makes it easy and convenient for viewers to purchase products seen in videos.
In particular, the inventors propose to draw the viewer's attention to certain products in a video and to allow the viewer to interact to buy the product directly in the video.
The proposed solution saves time as it eliminates the need to search for products viewed in videos.
Also, the proposed solution allows for the sense of immediacy that comes with online shopping by providing fast and efficient service to viewers.
Indeed, when viewers see a product that they like in a video, they can simply click a link or button to purchase it right away.

14 Claims, 4 Drawing Sheets

(51) Int. Cl.
*H04N 21/4725* (2011.01)
*H04N 21/4728* (2011.01)
*H04N 21/478* (2011.01)

(58) Field of Classification Search
USPC .......................................................... 725/116
See application file for complete search history.

(56) References Cited

U.S. PATENT DOCUMENTS

| | | | | |
|---|---|---|---|---|
| 2019/0244270 | A1* | 8/2019 | Kim | G06F 16/735 |
| 2022/0078529 | A1 | 3/2022 | Boskovich | |
| 2022/0141534 | A1 | 5/2022 | Pate | |

OTHER PUBLICATIONS

International Preliminary Report on Patentability for PCT/EP2024/060459, dated Jun. 11, 2025, 8 pages.

* cited by examiner

[Fig. 1]
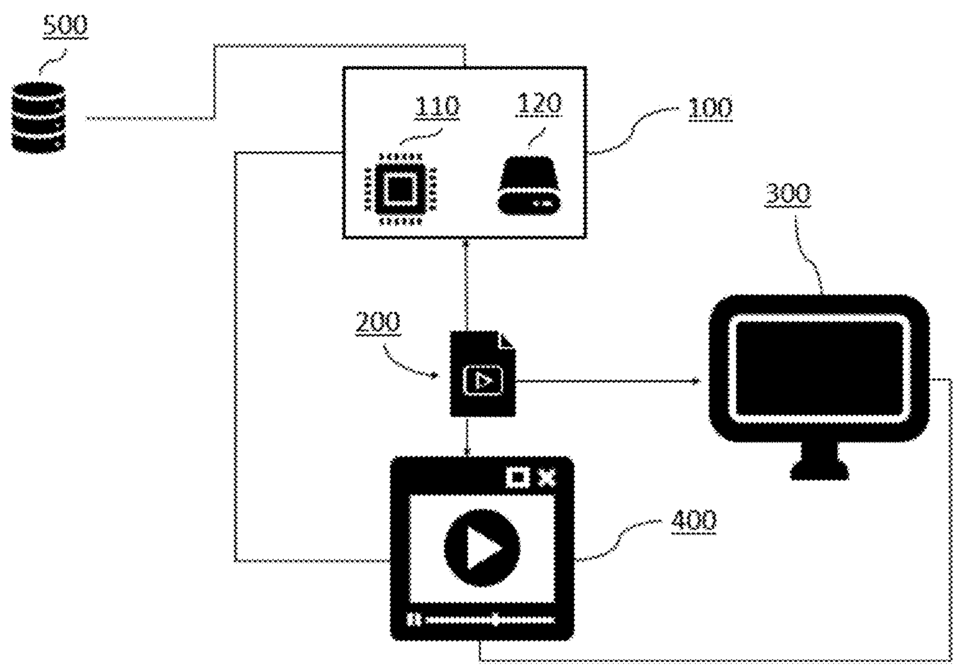
[Fig. 2]
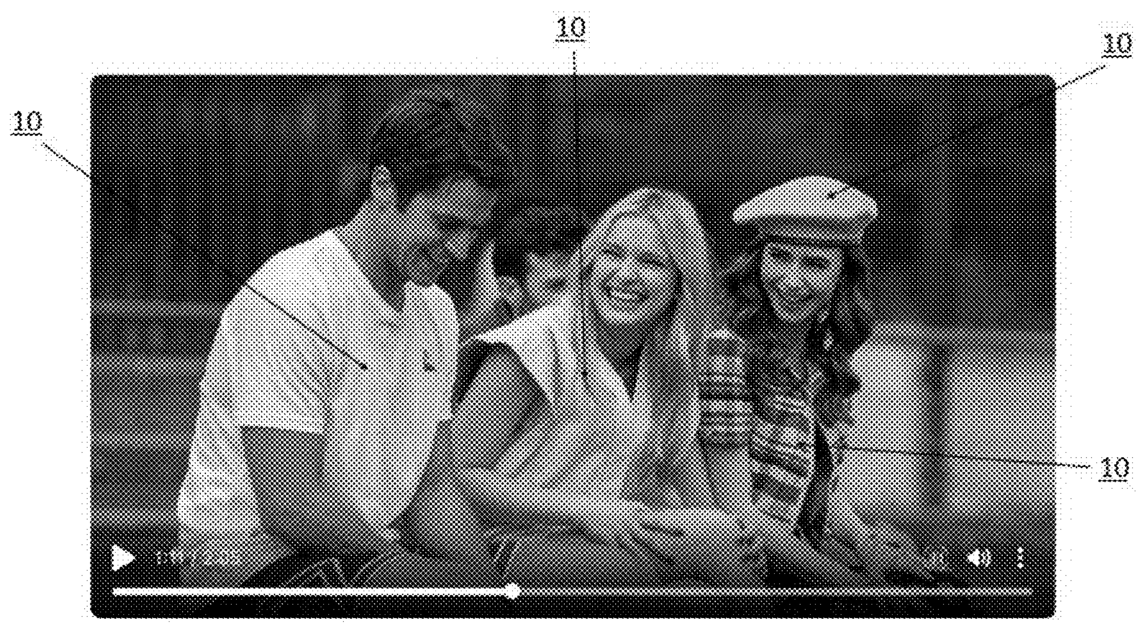

[Fig. 3]
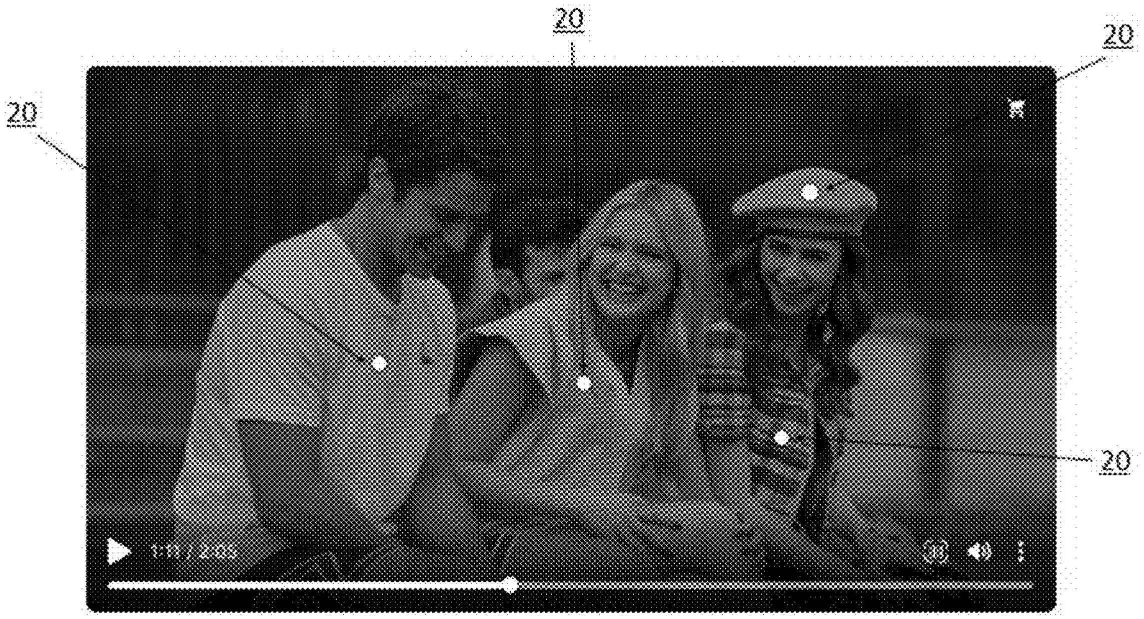
[Fig. 4]
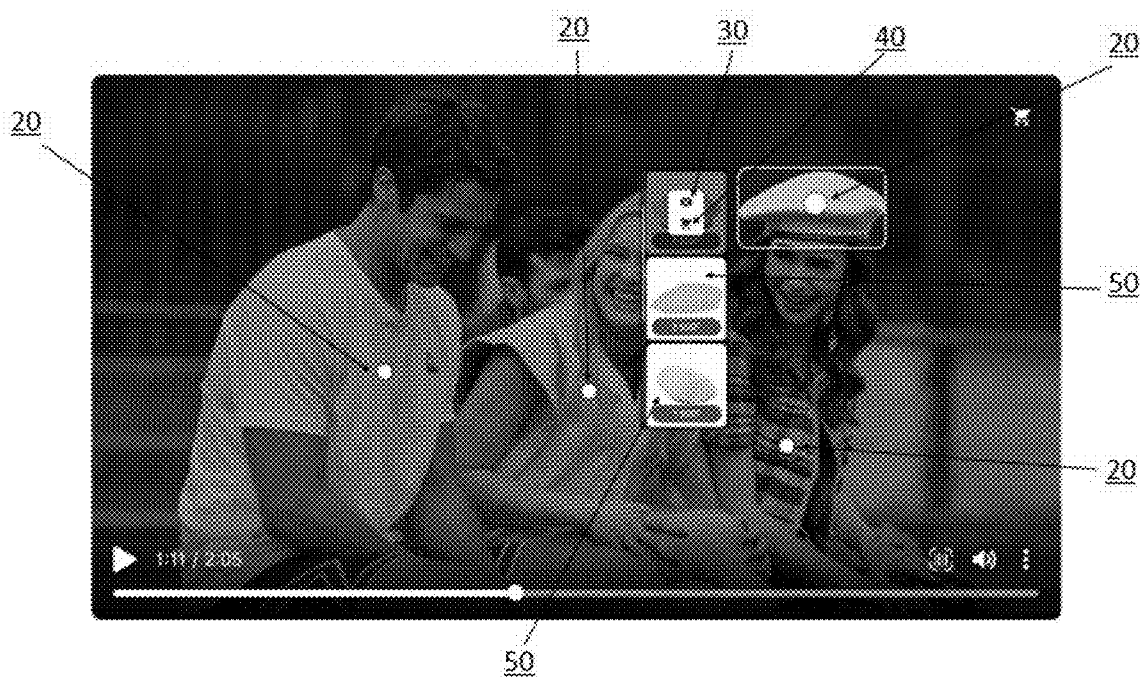

[Fig. 5]
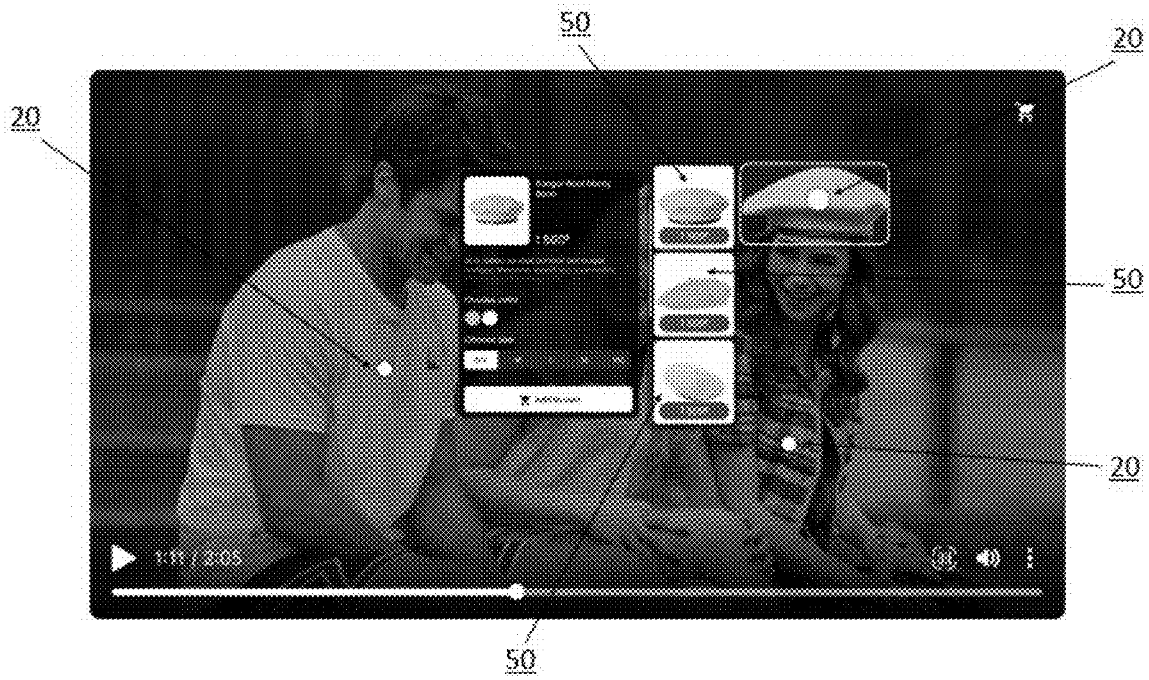
[Fig. 6]
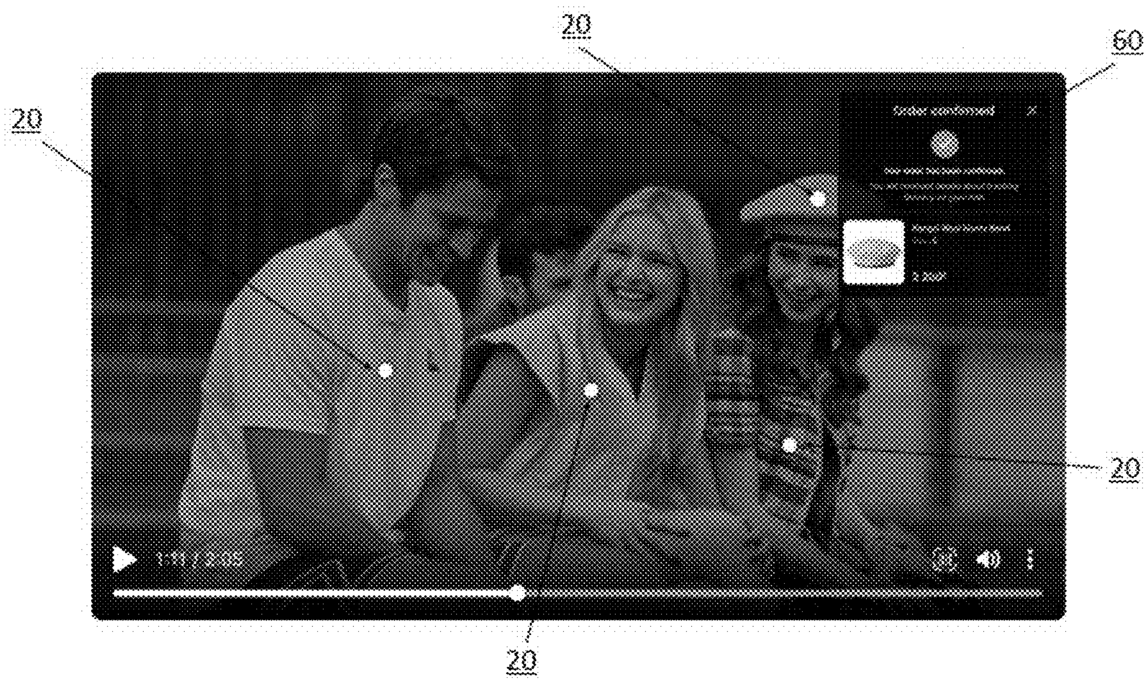

[Fig. 7]
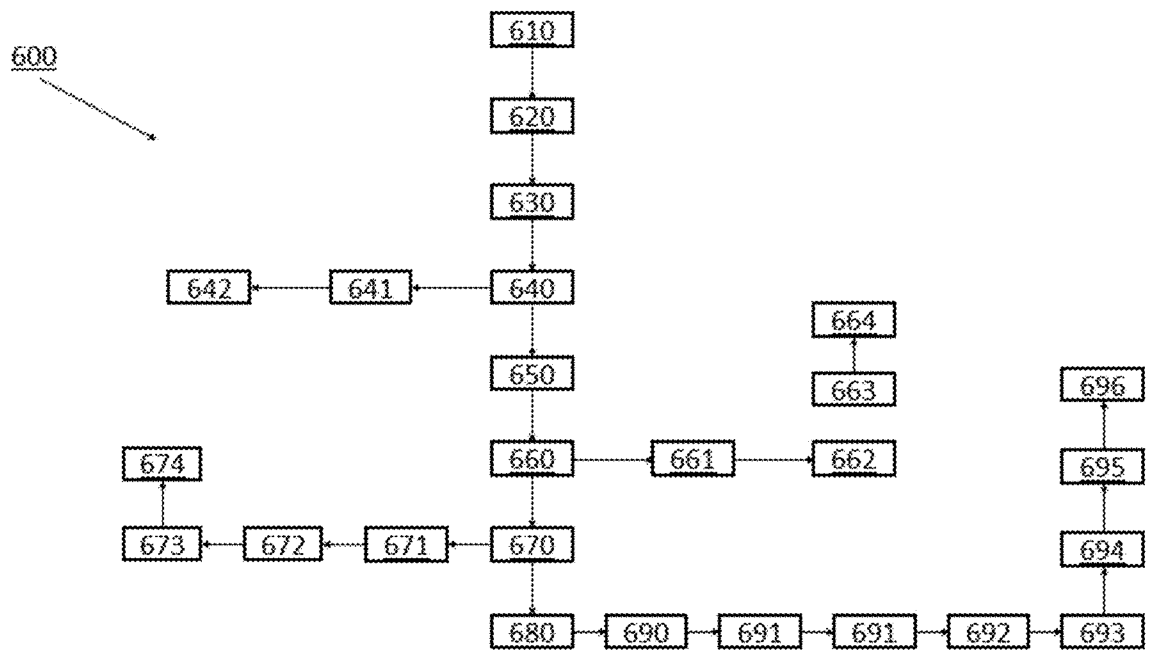

VIDEO OVERLAYERS, DISTRIBUTION MANAGEMENT SYSTEMS AND COMPUTER-IMPLEMENTED METHODS OF OVERLAYING A VIDEO WITH PRODUCT DATA

TECHNICAL FIELD

The subject application relates to the generation of overlays or superimposed images. In particular, it relates to video overlayers, distribution management systems and computer-implemented methods of overlaying a video with product data. Similar systems are known from US2018091859A1.

BACKGROUND ART

In recent years, the consumption of video content has skyrocketed, as people are watching more and more videos on their phones, tablets, computers, and TVs.

One interesting phenomenon that has been observed in relation with this increase in video consumption is the desire of viewers to buy the objects that appear in the video.

This desire is often sparked by the fact that when viewers see products being used or endorsed by people they admire or trust, they may be more likely to want those products for themselves.

However, it can often be inconvenient to stop the video and go searching for the object online. This is especially true if the video is engaging and captivating, and viewers do not want to break their immersion in the content.

One of the biggest challenges with searching for objects seen in videos is that viewers may not have enough information to find the exact product they are looking for. For example, if a viewer sees a shirt that they like in a video, they may not know the brand or style name of the shirt, making it difficult to find the exact product online. This can be frustrating and time-consuming, as viewers may have to sift through numerous search results to find the right product.

Another issue with searching for products seen in videos is that viewers may not be able to find the product at all. This can be due to a variety of factors, including the fact that the product may be out of stock, unavailable in the viewer's location, or discontinued. In some cases, the product may not even be a real product, but rather a prop or set decoration used in the video.

Finally, even if viewers are able to find the product they are looking for, they may be hesitant to purchase it online, especially if they have never purchased from the retailer before. This can be a particular concern if the product is expensive or if the viewer is unfamiliar with the retailer's return policy or shipping fees.

It is an object of the present subject application to provide a system that makes it easy and convenient for viewers to purchase products seen in videos.

SUMMARY OF SUBJECT APPLICATION

The subject application provides a video overlayer, a distribution management system and a computer-implemented method of overlaying a video with product data, as described in the accompanying claims.

Dependent claims describe specific embodiments of the subject application.

These and other aspects of the subject application will be apparent from an elucidated based on the embodiments described hereinafter.

BRIEF DESCRIPTION OF DRAWINGS

Further details, aspects and embodiments of the subject application will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 shows a schematic diagram of a system according to the subject application.

FIG. 2 shows a first visual appearance of a remarkable video frames according to the subject application.

FIG. 3 shows a second visual appearance of a remarkable video frames according to the subject application.

FIG. 4 shows a third visual appearance of a remarkable video frames according to the subject application.

FIG. 5 shows a fourth visual appearance of a remarkable video frames according to the subject application.

FIG. 6 shows a fifth visual appearance of a remarkable video frames according to the subject application.

FIG. 7 shows a schematic flow diagram according to the subject application.

DESCRIPTION OF EMBODIMENTS

Because the illustrated embodiments of the subject application may, for the most part, be composed of components known to the skilled person, details will not be described in any greater extent than that considered necessary for the understanding and appreciation of the underlying concepts of the subject application, in order not to obfuscate or distract from the teachings of the subject application.

The inventors have found that the use of an interactive video overlay makes it easy and convenient for viewers to purchase products seen in videos.

In particular, the inventors propose to draw the viewer's attention to certain products in a video and to allow the viewer to interact to buy the product directly in the video.

The proposed solution saves time as it eliminates the need to search for products viewed in videos.

Also, the proposed solution allows for the sense of immediacy that comes with online shopping by providing fast and efficient service to viewers.

Indeed, when viewers see a product that they like in a video, they can simply click a link or button to purchase it right away.

Further, the proposed solution provides an all-in-one interface where searching and making a purchase of products viewed in videos is done from within the video, thereby eliminating the need for viewers to switch between multiple applications or interfaces.

First Aspect: A Video Overlayer

As illustrated in FIG. 1, a first aspect of the subject application relates to a video overlayer 100.

As used herein, the term "video overlayer" refers to a device that overlays a video with content.

In the subject application, the video overlayer 100 comprises at least one first processor 110.

In other words, one should understand that the video overlayer 100 may comprise more than one first processor 110.

As illustrated in FIG. 1, the video overlayer 100 is designed for overlaying a video 200, at a viewer device 300, via a video player 400, with product data.

As used herein, the term "product data" refers to any information related to a product that is available for purchase, and that may incentivize a viewer to make a purchase or lead a viewer to a purchase.

For example, a "product data" can include various information such as the name of the product, the description of the product, the price of the product, the specification of the product, the reviews of the product, a URL to the product, and the availability of the product.

However, other known types of comprehensive and accurate product data that enable a viewer to make informed decisions about whether to purchase a product or not, may be contemplated, without requiring any substantial modification of the subject application.

The Video

As generally known in the art of video processing, the video 200 comprises a plurality of video frames which are associated with timing information.

In other words, the video 200 is made up of a sequence of individual video frames which are typically displayed at a constant frame rate to create the illusion of motion. Also, each video frame in the sequence captures a single still image, and when viewed in sequence, they create the appearance of continuous motion. Further, the number of frames per second (fps) in the video 200 can vary depending on the specific context, where 24 fps, 25 fps, 30 fps or 60 fps are common frame rates.

In a first example of the video 200, the video 200 is a video stream delivered over a network (e.g., the internet), for instance, via a cable provider, via a satellite TV provider or through an over-the-top (OTT) service.

However, other known types of video providers may be contemplated, without requiring any substantial modification of the subject application.

In a second example of the video 200, the video 200 is an offline video, for instance, downloaded and/or stored on a physical media (e.g., such as an HDD, a DVD or Blu-ray disc).

However, other known types of videos may be contemplated, without requiring any substantial modification of the subject application.

In an embodiment of the video 200, each video frame is associated with complementary data.

In particular, the complementary data comprises the timing information.

In an example of the complementary data, the timing information is a timecode.

However, other known forms of timing information may be contemplated, without requiring any substantial modification of the subject application.

The Remarkable Video Frames of the Video

In the subject application, at least one video frame of the video 200, called remarkable video frame, comprises at least one visually identifiable object of interest.

In other words, one should understand that the video 200 may comprise more than one remarkable video frame and that a remarkable video frame may comprise more than one visually identifiable object of interest.

As used herein, the term "visually identifiable object of interest" refers to an object that can be recognized or distinguished, within a video frame, based on its appearance or visual characteristics (e.g., color, shape, size, texture, and other visual cues that can help differentiate the object from its surroundings).

FIG. 2 illustrates a plurality of visually identifiable objects of interest 10, in particular clothes such as tops (i.e., a white t-shirt, a pale-yellow blouse, and a multicolor zippered top) and headwear (i.e., a yellow beret).

As generally known in the art of computer vision, one can detect and track visually identifiable objects of interest 10 using various techniques (e.g., object detection, recognition, and segmentation) which rely on algorithms that can analyze and interpret visual data to identify and locate specific objects within an image or video.

In a particular embodiment, the type of visually identifiable object of interest 10 that can be identified in the video 200 is selected from among a plurality of predetermined type of objects (e.g., people-related objects such as top clothes, bottom clothes, bags, footwear, headwear; vehicles; electronics; appliances; sports equipment; musical instruments; kitchenware; art and decor; office supplies).

In that particular embodiment, the first processor 110 may be configured for overlaying the video 200 with an interactive menu having a plurality of user-selectable options.

In practice, each user selectable option is configured for allowing a predetermined viewer interaction.

In an example of that particular embodiment, the predetermined viewer interaction is selected from among, a hover, a click, a swipe, a drag and drop, a voice, a gesture, a keyboard input or any suitable combination thereof.

However, other known types of viewer interaction may be contemplated, without requiring any substantial modification of the subject application.

In an embodiment of the predetermined viewer interaction, the viewer interaction is considered only after a period of time of interaction (e.g., hovering for two seconds).

Further, the interactive menu may be configured according to the plurality of predetermined objects, such that each user selectable option is associated with at least one predetermined object.

In other words, one should understand that each user selectable option may be associated with more than one predetermined object.

In that particular embodiment, the viewer may select desired or undesired user selectable options associated with the predetermined objects that should be identified.

In the subject application, the location of the visually identifiable object of interest 10, in the video frame, is previously known or determined.

In a first embodiment, when the location of the visually identifiable object of interest 10, in the video frame, is previously known, each remarkable video frame is associated with complementary data.

In particular, the complementary data comprises the location of the visually identifiable objects of interest 10 which are present on the remarkable video frame.

In a second embodiment, when the location of the visually identifiable object of interest 10, in the video frame, is determined, the first processor 110 is configured for automatically detecting, within at least one video frame of the video 200, at least one visually identifiable object of interest 10 using an image recognition software configured for identifying an image area and attributing it to a product.

In other words, one should understand that the first processor 110 may automatically detect more than one visually identifiable object of interest 10 within all or part of the video frames of the video 200.

The Viewer Device

In the subject application, the viewer device 300 has at least one display.

In other words, one should understand that the viewer device 300 may have more than one display.

As used herein, the term "viewer device" refers to a device (also known as "client device" or "end-user device") that is used for accessing and viewing a video.

For example, the viewer device may be a computer, a smartphone, a tablet or a smart TV.

However, other known types of viewer device may be contemplated, without requiring any substantial modification of the subject application.

The Video Player

In the subject application, the video player 400 is configured for displaying the video 200 on the display of the viewer device 300.

In practice, the video player 400 has a play function and a pause function.

The play function is configured for playing a video.

The pausing function being configured for pausing the playing of a video.

Of course, the video player 400 may have other functions such as a rewind function, a fast-forward function, a playback speed control function, and playback quality settings function.

In a first example of the video player 400, the video player 400 is an application (e.g., a web application, a streaming application).

In a second example of the video player 400, the video player 400 is a built-in functionality of the viewer device 300.

However, other known types of implementation of video players may be contemplated, without requiring any substantial modification of the subject application.

The Product Database

As illustrated in FIG. 1, the first processor 110 is configured for accessing a product database 500.

The product database 500 is configured for allowing the retrieval of the product data that is associated with a product image.

In practice, the product database 500 associates at least one product image with product data.

In other words, one should understand that the product database 500 may associate more than one product image with product data.

In a first example of the product database 500, the product data is provided by one or more retailers.

In a second example of the product database 500, the product data is provided by one or more product manufacturers.

However, other known types of product data providers may be contemplated, without requiring any substantial modification of the subject application.

In a first embodiment, the product database 500 is located locally with respect to the viewer device 300.

In a second embodiment, the product database 500 is located remotely with respect to the viewer device 300.

In a first example of the second embodiment, the product database 500 is located at the video overlayer 100.

In a second example of the second embodiment, the product database 500 is located at a remote server.

However, other locations of the product database 500 may be contemplated, without requiring any substantial modification of the subject application.

In a third example of the second embodiment, the product database 500 is continuously updated to reflect the most recent product data.

In other words, in the third example of the second embodiment, product data is added to the database 500 as soon as it is provided by the providers (e.g., the retailers and the product manufacturers) and existing product data is updated to reflect any changes or corrections made to it.

Hence, by continuously updating of the product database 500, the proposed solution ensures that viewers have access to the most current and accurate product data available, allowing them to make informed decisions about whether to purchase a product or not.

The Human Perceptible Video Overlay

In the subject application, the first processor 110 is configured for providing a human perceptible video overlay.

As used herein, the term "human perceptible video overlay" refers to a visual element that is added on top of a video or video frame, and that can be seen by a human viewer.

In practice, the human perceptible video overlay is configured for being synchronized in time with the video 200 based on the timing information, such that all or part of its content is configured for overlaying the video 200 at a particular point in time of the video 200.

In particular, the human perceptible video overlay comprises, for at least one remarkable video frame, at least one first overlay container and at least one second overlay container.

In other words, one should understand that the human perceptible video overlay may comprise, for more than one remarkable video frame, more than one first overlay container and more than one second overlay container.

The First Overlay Container

In particular, the first overlay container associated with a remarkable video frame, is configured for overlaying the remarkable video frame with a first interactive content.

In practice, the first interactive content is configured for allowing a predetermined viewer interaction.

In the subject application, the location of the points defining a border of the first interactive content is previously known or determined.

In a first embodiment, when the location of the points defining a border of the first interactive content is previously known, each remarkable video frame is associated with complementary data.

In particular, the complementary data comprises the location of the points defining a border of the first interactive content is which are present on the remarkable video frame.

In a second embodiment, when the location of the points defining a border of the first interactive content is determined, the first processor 110 is configured for automatically detecting, within at least one video frame of the video 200, the border of at least one first interactive content using an image segmentation software configured for segmentation an image area and attributing it to a product.

In other words, one should understand that the first processor 110 may automatically detect more than one border of a visually identifiable object of interest 10 within all or part of the video frames of the video 200.

In a first embodiment of the first interactive content, the first interactive content comprises at least one interactive symbol configured for overlaying all or part of the visually identifiable object of interest 10.

In other words, one should understand that the first interactive content may comprise more than one interactive symbol.

In a first example of the first embodiment of the first interactive content, the shape of the first interactive content is selected from among, a rectangular shape, an octagonal shape, a circular shape or any suitable combination thereof.

However, other known shapes, may be contemplated, without requiring any substantial modification of the subject application.

FIG. 3 illustrates the first example of the first embodiment of the first interactive content 20, where the first interactive content 20 has as a circular shape and a white color.

In a second example of the first embodiment of the first interactive content 20, the first interactive content 20 is positioned centrally with respect to the border of the visually identifiable object of interest 10.

However, other positions of the first interactive content 20 with respect to the border of the visually identifiable object of interest 10 may be contemplated, without requiring any substantial modification of the subject application.

In a second embodiment of the first interactive content 20, as shown in FIG. 4, the first interactive content 20 comprises a first interactive bounding box surrounding the visually identifiable object of interest 10 and configured for overlaying the visually identifiable object of interest 10.

In a third embodiment of the first interactive content 20, the first interactive content 20 comprises a second interactive bounding box configured for comprising a list of visually identifiable objects of interest 10 that are present on the remarkable video frame.

The Second Overlay Container

In the subject application, the second overlay container is associated with the first overlay container.

Also, the second overlay container is configured for overlaying the remarkable video frame with a second interactive content.

In practice, the second interactive content has at least one user selectable option.

In other words, one should understand that the second interactive content may comprise more than one user selectable option.

In a first example of the second interactive content, the second interactive content comprises a user selectable option including at least one of "view", "follow", "add to wish list", "product image", "apply coupon code" and "add to shopping cart".

However, other options may be contemplated, without requiring any substantial modification of the subject application.

FIG. 4 illustrates the first example of the second interactive content, with a "view" user-selectable option 30, an "add to shopping cart" user-selectable option 40 and "product image" user-selectable option 50.

In a second example of the second interactive content, the second interactive content may be a web page or an interactive menu.

However, other implementations of user-selectable options, may be contemplated, without requiring any substantial modification of the subject application.

FIG. 5 illustrates the second example of the second interactive content, where an interactive menu is shown (on the left side) after user interaction with the a "product image" user-selectable option 50.

In practice, each user selectable option is configured for allowing a predetermined viewer interaction.

In particular, the second interactive content is configured according to the product data of at least one product associated with the visually identifiable object of interest 10, such that each user selectable option is associated with the product data of at least one product associated with the visually identifiable object of interest 10.

In other words, one should understand that the second interactive content may be configured according to the product data of more than one product associated with the visually identifiable object of interest 10.

In a first example of the second interactive content, the shape of second interactive content is selected from among, a rectangular shape, an octagonal shape, a circular shape or any suitable combination thereof.

However, other known shapes, may be contemplated, without requiring any substantial modification of the subject application.

In a second example of the second interactive content, the second interactive content is positioned adjacent to the first interactive content 20.

However, other positions of the second interactive content with respect to the first interactive content 20 may be contemplated, without requiring any substantial modification of the subject application.

The Video Overlayer In Operation

Now that we have presented the overall architecture of the video overlayer 100, we can describe its operation.

In operation, the first processor 110 is configured for executing the play function of the video player 400.

Still, in operation, when the current video frame is a remarkable video frame, the first processor 110 is configured for displaying the corresponding first overlay container.

Further, in operation, in response to a predetermined viewer interaction with the first interactive content 20 or the pause function, the first processor 110 is configured for pausing the playing of the video 200.

Furthermore, in operation, when the playing of the video 200 is paused, the first processor 110 is configured as follows.

First, the first processor 110 is configured for obtaining, based on the current remarkable video frame and the associated first overlay container, an image crop that includes the visually identifiable object of interest 10.

Then, the first processor 110 is configured for recognizing or identifying, from the product database 500, based on the image crop, at least one product image that substantially matches the visually identifiable object of interest 10.

In other words, one should understand that the first processor 110 may be configured for recognizing or identifying more than one product image that substantially matches the visually identifiable object of interest 10.

Further, the first processor 110 is configured for retrieving, from the product database 500, the product data that is associated with the recognized product.

Finally, the first processor 110 is configured for displaying the second overlay container according to the retrieved product data.

First Embodiment of the First Aspect: Image Selection

A first embodiment of the first aspect of the subject application occurs before the first processor 110 displays the first overlay container.

In that case, the first processor 110 is configured for selecting, based on image information associated with each remarkable video frame, a single remarkable video frame from among a plurality of consecutive remarkable video frames.

In an variant of the first embodiment of the first aspect of the subject application, the first processor 110 uses known keyframe extraction techniques (e.g., content-based key-frame selection such as object detection) to select the single remarkable video frame as a key frame of the plurality of consecutive remarkable video frames, the key frame being a representative video frame of the plurality of consecutive remarkable video frames.

By using a single key frame rather than processing each consecutive remarkable video frames in a sequence, processing time and computational resources can be significantly reduced while still retaining the key visual information from the video 200.

In a variant of the first embodiment of the first aspect of the subject application, each remarkable video frame is associated with complementary data.

In particular, the complementary data comprises the image information.

Second Embodiment of the Third Aspect: Image Segmentation

A second embodiment of the first aspect of the subject application occurs before the first processor 110 recognizes or identifies the product image that substantially matches the visually identifiable object of interest 10.

In that case, the first processor 110 is configured for delineating, in the image crop, the visually identifiable object of interest 10 from a background region.

Finally, the first processor 110 is configured for subtracting the background region from the image crop so as to leave only a polygon bounding the visually identifiable object of interest 10 region.

The second embodiment of the first aspect of the subject application is particularly useful for the matching of the crop image and product images of the product database 500, because those images may not have been taken in the same context.

Indeed, the images may have been captured from different angles or under different lighting conditions.

In that case, variations in the background of the images can introduce significant noise and distortions that can impact the accuracy of the matching.

By removing the background around the object of interest before the matching, the effect of these variations can be significantly reduced, allowing for a more accurate and reliable matching.

In a first variant of the second embodiment of the first aspect of the subject application, the background of the product images in the product database 500 is previously removed before being stored.

In a second variant of the second embodiment of the first aspect of the subject application, the first processor 110 is configured to remove the background of the product images similarly to the crop image.

Third Embodiment of the First Aspect: Image Matching

A third embodiment of the first aspect of the subject application is a particular implementation of how to match the product image with the visually identifiable object of interest 10.

In that case, the first processor 110 is configured for generating a first embedding vector for the image crop using an embedding generation technique.

Then, the first processor 110 is configured for generating at least one second embedding vector for at least one product image using the embedding generation technique.

In other words, one should understand that the first processor 110 may generate more than one second embedding vector for more than one product image.

Further, the first processor 110 is configured for comparing the first embedding vector with all or part of the second embedding vectors, thereby generating a similarity measure for each comparison.

Finally, the first processor 110 is configured for selecting the product images associated with a similarity measure that is beyond a predetermined similarity measure.

By using embeddings, the matching can be significantly simplified and accelerated.

Indeed, rather than processing every pixel or feature of the crop image and the product images, the matching can be performed on the much smaller and more informative embedding vectors, which can be precomputed or calculated on-the-fly.

This approach can improve the accuracy and robustness of image matching algorithms, especially when dealing with large datasets, complex scenes, or dynamic environments.

Fourth Embodiment of the First Aspect: Video Resuming

A fourth embodiment of the first aspect of the subject application occurs when the first processor 110 resumes the playing of the video 200.

In that case, in response to a predetermined viewer interaction with the video player 400 and/or the human perceptible video overlay, the first processor 110 is configured for resuming the playing of the video 200, at a point where the playing of the video 200 was paused, the predetermined viewer interaction is indicative that the viewer interaction is complete.

In other words, the first processor 110 resumes the playing of the video 200 in response to either only a predetermined viewer interaction with the video player 400, only a predetermined viewer interaction with the human perceptible video overlay or from both a predetermined viewer interaction with the video player 400 and a predetermined viewer interaction with the human perceptible video overlay.

In a first variant of the fourth embodiment of the first aspect of the subject application, the completion of the viewer interaction is indicative of a purchase of a product associated with the visually identifiable object of interest 10.

FIG. 6 illustrates the first variant of the fourth embodiment of the first aspect of the subject, with the human perceptible video overlay displaying a confirmation 60 of a purchase of a product associated with the visually identifiable object of interest 10.

In a second variant of the fourth embodiment of the first aspect of the subject, the completion of the viewer interaction is indicative of a purchase of a desire to shop for a product associated with the visually identifiable object of interest 10.

In that case, as illustrated in FIG. 1, the video overlayer 100 comprises at least one memory 120.

In other words, one should understand that the video overlayer 100 may comprise more than one memory 120.

In the second variant of the fourth embodiment of the first aspect of the subject, the first processor 110 is further configured as follows.

First, the first processor 110 is configured for saving, as an entry in a wish list, an information representing the desire to shop for the product associated with the visually identifiable object of interest 10.

Then, the first processor 110 is configured for storing, in the memory 120, the wish list.

By saving products to a wish list, the viewer can keep track of products they are interested in, without the need to make an immediate purchase decision. This can help to reduce decision-making anxiety, increase satisfaction and loyalty, and ultimately lead to more sales and revenue for the retailer.

In a form of the second variant of the fourth embodiment of the first aspect of the subject, the first processor 110 is configured for modifying the human perceptible video overlay to further comprise at least one third overlay container.

In other words, one should understand that, after the modification, the human perceptible video overlay may comprise more than one third overlay container.

In the form of the second variant of the fourth embodiment of the first aspect of the subject, the third container is configured for overlaying the remarkable video frame with a third interactive content having at least one user selectable option.

In other words, one should understand that the third interactive content may have more than one user selectable option.

In a first example of the third interactive content, the third interactive content comprises a user selectable option including at least one of "view wish list", "remove from wish list", "add to shopping cart", "update shopping cart", "checkout" and "apply coupon code".

However, other options may be contemplated, without requiring any substantial modification of the subject application.

In a second example of the third interactive content, the third interactive content may be a web page or an interactive menu.

However, other implementations of user-selectable options, may be contemplated, without requiring any substantial modification of the subject application.

In practice, each user selectable option is configured for allowing a predetermined viewer interaction.

In particular, the third interactive content is configured according to all or part of a wish list, such that each user selectable option is associated with at least one entry of the wish list.

In other words, one should understand that each user selectable option may be associated with more than one entry of the wish list.

Further, when the playing of the video 200 is paused, in response to a predetermined viewer interaction with the video player 400 and/or the human perceptible video overlay, the first processor 110 is configured for displaying the third overlay container according to all or part of the wish list.

In other words, the first processor 110 displays the third overlay container in response to either only a predetermined viewer interaction with the video player 400, only a predetermined viewer interaction with the human perceptible video overlay or from both a predetermined viewer interaction with the video player 400 and a predetermined viewer interaction with the human perceptible video overlay.

Second Aspect: A Distribution Management System

A second aspect of the subject application relates to a distribution management system of a media asset management system (MAM).

As generally known in the art of digital asset management, a MAM is a software-based system that is designed to help organizations (e.g., OTTs, television networks, film studios, advertising agencies, government organizations, educational institutions, corporate marketing departments) manage their digital media assets (e.g., videos, audios, images, and other related files).

Also, within a MAM, the distribution management system is designed to help those organizations distribute their digital media assets.

In the subject application, the distribution management system is configured for distributing at least one video 200 to the viewer device 300.

In other words, one should understand that the distribution management system may be configured for distributing more than one video 200 to the viewer device 300.

In practice, the distribution management system comprises the video overlayer 100, the video player 400 and the product database 500.

Third Aspect: A Computer-Implemented Method

As illustrated in FIG. 7, a third aspect of the subject application relates to a computer-implemented method 600 of overlaying the video 200 with product data.

First, the computer-implemented method 600 comprises the step of providing 610 the viewer device 300, the video player 400, the product database 500, as already described above.

Also, the step of providing further comprises providing a second processor 700 that is similar or identical to the first processor 110.

Then, with the second processor 700, the computer-implemented method 600 comprises the step of obtaining 620 the video 200, as already described above.

Further, with the second processor 700, the computer-implemented method 600 comprises the step of providing 630 the human perceptible video overlay, as already described above.

Still further, with the second processor 700, the computer-implemented method 600 comprises the step of executing 640 the play function of the video player 400, as already described above.

Furthermore, with the second processor 700, when the current video frame is a remarkable video frame, the computer-implemented method 600 comprises the step of displaying 650 the corresponding first overlay container, as already described above.

Moreover, with the second processor 700, in response to a predetermined viewer interaction with the first interactive content 20 or the pause function, the computer-implemented method 600 comprises the step of pausing 660 the playing of the video 200, as already described above.

Later, with the second processor 700, when the playing of the video 200 is paused, the computer-implemented method 600 comprises the following steps.

First, with the second processor 700, the computer-implemented method 600 comprises the step of obtaining 670, based on the current remarkable video frame and the associated first overlay container, an image crop that includes the visually identifiable object of interest 10, as already described above.

Then, the computer-implemented method 600 comprises the step of providing 661 an image crop database associating at least one image crop, with a first overlay container associated with a remarkable video frame, as already described above.

Further, the computer-implemented method 600 comprises the step of obtaining 662 the image crop from the image crop database, as already described above.

Furthermore, with the second processor 700, the computer-implemented method 600 comprises the step of recognizing or identifying 680, from the product database 500, based on the image crop, at least one product image that substantially matches the visually identifiable object of interest 10, as already described above.

Moreover, with the second processor 700, the computer-implemented method 600 comprises the step of retrieving 690, from the product database 500, the product data that is associated with the recognized product, as already described above.

Finally, with the second processor 700, the computer-implemented method 600 comprises the step of displaying 691 the second overlay container according to the retrieved product data, as already described above.

First Embodiment of the Third Aspect: Image Selection

A first embodiment of the third aspect of the subject application occurs before the step of displaying 650 the first overlay container, and provides the advantageous effect already explained above.

In that case, with the second processor 700, the computer-implemented method 600 comprises the step of selecting 641, based on image information associated with each remarkable video frame, only one remarkable video frame from among a plurality of consecutive remarkable video frames.

In a first variant of the first embodiment of the third aspect of the subject application, the second processor 700 uses know keyframe extraction techniques (e.g., content-based keyframe selection such as object detection) to select the single remarkable video frame as a key frame of the plurality of consecutive remarkable video frames, the key frame being a representative video frame of the plurality of consecutive remarkable video frames.

In a second variant of the first embodiment of the third aspect of the subject application, each remarkable video frame is associated with complementary data.

In particular, the complementary data comprises the image information.

Second Embodiment of the Third Aspect: Image Segmentation

A second embodiment of the third aspect of the subject application occurs before the step of recognizing or identifying 680, and provides the advantageous effect already explained above.

In that case, with the second processor 700, the computer-implemented method 600 comprises the step of delineating 663, in the image crop, the visually identifiable object of interest 10 from a background region.

Finally, with the second processor 700, the computer-implemented method 600 comprises the step of subtracting 664 the background region from the image crop so as to leave only a polygon bounding the visually identifiable object of interest 10 region.

In a first variant of the second embodiment of the third aspect of the subject application, the background of the product images in the product database 500 is previously removed before being stored.

In a second variant of the second embodiment of the third aspect of the subject application, the first processor 110 is configured to remove the background of the product images similarly to the crop image.

Third Embodiment of the Third Aspect: Image Matching

A third embodiment of the third aspect of the subject application occurs during the step of recognizing or identifying 680, and provides the advantageous effect already explained above.

In that case, with the second processor 700, the computer-implemented method 600 comprises the step of generating 671 a first embedding vector for the image crop using an embedding generation technique.

Then, with the second processor 700, the computer-implemented method 600 comprises the step of generating 672 at least one second embedding vector for at least one product image using the embedding generation technique.

In other words, one should understand that the second processor 700 may generate more than one second embedding vector for more than one product image.

Further, with the second processor 700, the computer-implemented method 600 comprises the step of comparing 673 the first embedding vector with all or part of the second embedding vectors, thereby generating a similarity measure for each comparison.

Finally, with the second processor 700, the computer-implemented method 600 comprises the step of selecting 674 the product images associated with a similarity measure that is beyond a predetermined similarity measure.

Fourth Embodiment of the Third Aspect: Video Resuming

A fourth embodiment of the third aspect of the subject application occurs when resuming the playing of the video 200, and provides the advantageous effect already explained above.

In that case, with the second processor 700, in response to a predetermined viewer interaction with the video player 400 and/or the human perceptible video overlay, the computer-implemented method 600 comprises the step of resuming 692 the playing of the video 200, at a point where the playing of the video 200 was paused, the predetermined viewer interaction being indicative that the viewer interaction is complete.

In other words, the step of resuming 692 the playing of the video 200 can be, in response to either only a predetermined viewer interaction with the video player 400, only a predetermined viewer interaction with the human perceptible video overlay or from both a predetermined viewer interaction with the video player 400 and a predetermined viewer interaction with the human perceptible video overlay.

In a first variant of the fourth embodiment of the third aspect of the subject application, the completion of the viewer interaction is indicative of a purchase of a product associated with the visually identifiable object of interest 10.

In a second variant of the fourth embodiment of the third aspect of the subject application, the completion of the viewer interaction is indicative of a purchase of a desire to shop for a product associated with the visually identifiable object of interest 10.

In the second variant of the fourth embodiment of the third aspect of the subject application, the computer-implemented method 600 comprises the step of providing 693 at least one memory 120.

In other words, one should understand that the step of providing 693 may comprise providing more than one memory 120.

Further, in the second variant of the fourth embodiment of the third aspect of the subject application, the computer-implemented method 600 comprises the following steps.

First, the computer-implemented method 600 comprises the step of saving 694, as an entry in a wish list, an information representing the desire to shop for the product associated with the visually identifiable object of interest 10.

Then, the computer-implemented method 600 comprises the step of storing 695, in the memory 120, the wish list.

In a form of the second variant of the fourth embodiment of the third aspect of the subject application, with the second processor 700, the computer-implemented method 600 comprises the step of modifying 696 the human perceptible video overlay to further comprise at least one third overlay container.

In other words, one should understand that the human perceptible video overlay may comprise more than one third overlay container.

The third container is configured for overlaying the remarkable video frame with a third interactive content having at least one user selectable option.

In other words, one should understand that the third interactive content may have more than one user selectable option.

In a first example of the third interactive content, the third interactive content comprises a user selectable option including at least one of "view wish list", "remove from wish list", "add to shopping cart", "update shopping cart", "checkout" and "apply coupon code".

However, other options may be contemplated, without requiring any substantial modification of the subject application.

In a second example of the third interactive content, the third interactive content may be a web page or an interactive menu.

However, other implementations of user-selectable options, may be contemplated, without requiring any substantial modification of the subject application.

In practice, each user selectable option is configured for allowing a predetermined viewer interaction.

In particular, the third interactive content is configured according to all or part of a wish list, such that each user selectable option is associated with at least one entry of the wish list.

In other words, one should understand that each user selectable option may be associated with more than one entry of the wish list.

Further, when the playing of the video 200 is paused, with the second processor 700, in response to a predetermined viewer interaction with the video player 400 and/or the human perceptible video overlay, the computer-implemented method 600 comprises the step of displaying 697 the third overlay container according to all or part of the wish list.

In other words, the step of displaying 697 the third overlay container can be in response to either only a predetermined viewer interaction with the video player 400, only a predetermined viewer interaction with the human perceptible video overlay or from both a predetermined viewer interaction with the video player 400 and a predetermined viewer interaction with the human perceptible video overlay.

Fourth Aspect: A Computer-Readable Medium

A fourth aspect of the subject application also relates to a computer-readable medium having stored thereon computer instructions which when executed, by a processor, perform the computer-implemented method 600 as already described above.

Fifth Aspect: A Computer Program Product

A fifth aspect of the subject application relates to a computer program product comprising instructions which, when the program is executed by a computer, cause the computer to carry out the steps of the computer-implemented method 600 as already described above.

Various Other Embodiments

The description of the subject application has been presented for purposes of illustration and description but is not intended to be exhaustive or limited to the application in the form disclosed.

The embodiments were chosen and described to better explain the principles of the application and the practical application, and to enable the skilled person to understand the application for various embodiments with various modifications as are suited to the particular use contemplated.

For instance, the skilled person could easily adapt the teachings of the subject application when the viewer device 300 has more than one display.

In that case, the first overlay container and second overlay container may be displayed, respectively displayed on different display.

For example, the first interactive content 20 may be displayed on a first display of the viewer device 300, and the second interactive content and/or the third interactive content may be displayed on a first display of the viewer device 300.

When the description states that an element is "configured" for a purpose of performing the desired function, it means that the element is created specifically for the purpose of performing the desired function.

However, depending on the needs and available resources, it may be possible to use an existing similar element, which is modified or adapted to achieve the desired function, without requiring substantial modifications to the invention.

The invention claimed is:

1. A video overlayer for overlaying a video, at a viewer device, via a video player, with product data, the video comprising a plurality of video frames associated with timing information, wherein at least one video frame, called remarkable video frame, comprises at least one visually identifiable object of interest, which location in the video frame being previously known or determined, the viewer device having at least one display, the video player being configured for displaying the video on the display, the video player having a play function and a pause function, the play function being configured for playing a video, the pausing function being configured for pausing the playing of a video, the video overlayer comprising, at least one first processor configured for, accessing a product database associating at least one product image with product data, providing a human perceptible video overlay which is configured to be synchronized in time with the video based on the timing information, such that all or part of its content overlays the video, at a particular point in time of the video, the human perceptible video overlay comprising, for at least one remarkable video frame, at least one first overlay container configured for overlaying the remarkable video frame with a first interactive content configured for allowing a predetermined viewer interaction, the location of the points defining a border of the first interactive content being previously known or determined, and at least one second overlay container, associated with the first overlay container, and configured for overlaying the remarkable video frame with a second interactive content having at least one user selectable option configured for allowing a predetermined viewer interaction, the second interactive content being configured according to the product data of at least one product associated with the visually identifiable object of interest, executing the play function of the video player, and when the current video frame is a remarkable video frame, displaying the corresponding first overlay container, wherein, the first processor is further configured for pausing the playing of the video, in response to a predetermined viewer interaction with the first interactive content or the pause function, the first processor is further configured for, when the playing of the video is paused, obtaining, based on the current remarkable video frame and the associated first overlay container, an image crop that includes the visually identifiable object of interest, recognizing or identifying, from the product database, based on the image crop, at least one product image that substantially matches the visually identifiable object of interest, retrieving, from the product database, the product data that is associated with the recognized product, and displaying the second overlay container according to the retrieved product data.

2. The video overlayer of claim 1, wherein the first interactive content comprises at least one interactive symbol configured for overlaying all or part of the visually identifiable object of interest.

3. The video overlayer of claim 1, wherein the first interactive content comprises a first interactive bounding box surrounding the visually identifiable object of interest and configured for overlaying the visually identifiable object of interest.

4. The video overlayer of claim 1, wherein the first interactive content comprises a second interactive bounding box configured for comprising a list of visually identifiable objects of interest that are present on the remarkable video frame.

5. The video overlayer of claim 1, wherein the first processor is further configured for selecting, based on image information associated with each remarkable video frame, a single remarkable video frame from among a plurality of consecutive remarkable video frames.

6. A distribution management system of a media asset management system, for distributing at least one video to a viewer device having at least one display, the distribution management system comprising, the video overlayer according to claim 1, a video player configured for displaying a video on the display, the video player having a play function and a pause function, the play function being configured for playing a video, the pausing function being configured for pausing the playing of a video, and a product database associating at least one product image with product data.

7. A computer-implemented method of overlaying a video with product data, the computer-implemented method being performed in a system comprising, a viewer device having at least one display, a video player configured for displaying a video on the display, the video player having a play function and a pause function, the play function being configured for playing a video, the pausing function being configured for pausing the playing of a video, a product database associating at least one product image with product data, and, at least one second processor, the computer-implemented method comprising the steps of, with the second processor, obtaining a video to be played by the video player, the video comprising a plurality of video frames and timing information associated with the plurality of video frames, wherein at least one video frame, called remarkable video frame, comprises at least one visually identifiable object of interest, which location in the video frame being previously known or determined, providing a human perceptible video overlay which is configured to be synchronized in time with the video based on the timing information, such that all or part of its content overlays the video, at a particular point in time of the video, the human perceptible video overlay comprising, for at least one remarkable video frame, at least one first overlay container configured for overlaying the remarkable video frame with a first interactive content configured for allowing a predetermined viewer interaction, the location of the points defining a border of the first interactive content being previously known or determined and at least one second overlay container, associated with the first overlay container, and configured for overlaying the remarkable video frame with a second interactive content having at least one user selectable option configured for allowing a predetermined viewer interaction, the second interactive content being configured according to the product data of at least one product associated with the visually identifiable object of interest, executing the play function of the video player, and when the current video frame is a remarkable video frame, displaying the corresponding first overlay container wherein, with the second processor, in response to a predetermined viewer interaction with the first interactive content or the pause function, pausing the playing of the video, when the playing of the video is paused, obtaining, based on the current remarkable video frame and the associated first overlay container, an image crop that includes the visually identifiable object of interest, recognizing or identifying, from the product database, based on the image crop, at least one product image that substantially matches the visually identifiable object of interest, retrieving, from the product database, the product data that is associated with the recognized product, and displaying the second overlay container according to the retrieved product data.

8. The computer-implemented method of claim 7, further comprising, with the second processor, before the step of displaying the first overlay container, selecting, based on image information associated with each remarkable video frame, only one remarkable video frame from among a plurality of consecutive remarkable video frames.

9. The computer-implemented method of claim 7, further comprising, with the second processor, before the step of recognizing or identifying, delineating, in the image crop, the visually identifiable object of interest from a background region, and subtracting the background region from the image crop so as to leave only a polygon bounding the visually identifiable object of interest region.

10. The computer-implemented method of claim 7, further comprising, with the second processor, the step of recognizing or identifying comprises the steps of, generating a first embedding vector for the image crop using an embedding generation technique, generating at least one second embedding vector for at least one product image using the embedding generation technique, comparing the first embedding vector with all or part of the second embedding vectors, thereby generating a similarity measure for each comparison, and selecting the product images associated with a similarity measure that is beyond a predetermined similarity measure.

11. The computer-implemented method of claim 7, further comprising, with the second processor, in response to a predetermined viewer interaction with the video player and/or the human perceptible video overlay, resuming the playing of the video, at a point where the playing of the video was paused, the predetermined viewer interaction is indicative that the viewer interaction is complete.

12. The computer-implemented method of claim 11, further comprising, providing a memory, wherein, with the second processor, when the viewer interaction completion is indicative of a desire to shop for a product associated with the visually identifiable object of interest, saving, in a wish list, an information representing the desire to shop for the product associated with the visually identifiable object of interest, and storing, in the memory, the wish list.

13. The computer-implemented method of claim 12, further comprising, with the second processor, modifying the human perceptible video overlay to further comprise at least one third overlay container configured for overlaying the remarkable video frame with a third interactive content having at least one user selectable option configured for allowing a predetermined viewer interaction, the third interactive content being configured according to all or part of a wish list, wherein, when the playing of the video is paused, with the second processor, in response to a predetermined viewer interaction with the video player and/or the human perceptible video overlay, displaying the third overlay container according to all or part of the wish list.

14. A computer program product comprising a non-transitory computer-readable medium storing instructions which, when the program is executed by a computer, cause the computer to carry out the steps of the computer-implemented method according to claim 7.

* * * * *